Sept. 4, 1962        W. W. McMILLAN        3,052,102

HEAT PUMP AND METHOD OF OPERATION

Filed April 5, 1957                           2 Sheets—Sheet 1

INVENTOR
*W. W. McMillan*

BY *Mason, Fenwick & Lawrence*
ATTORNEYS

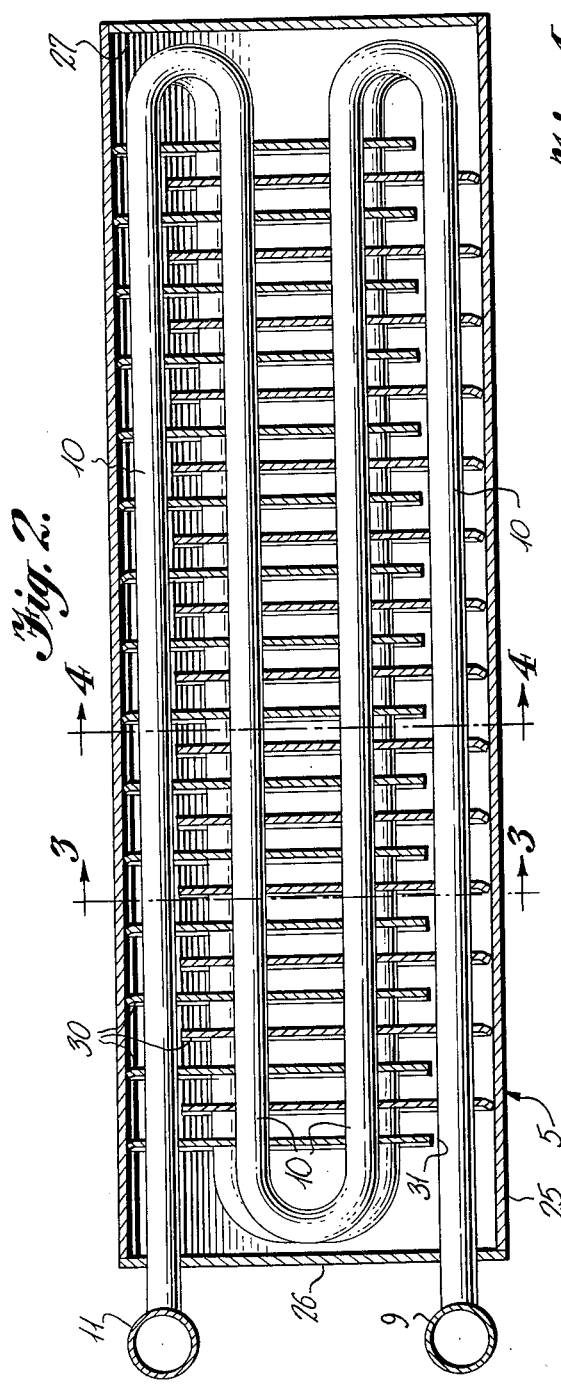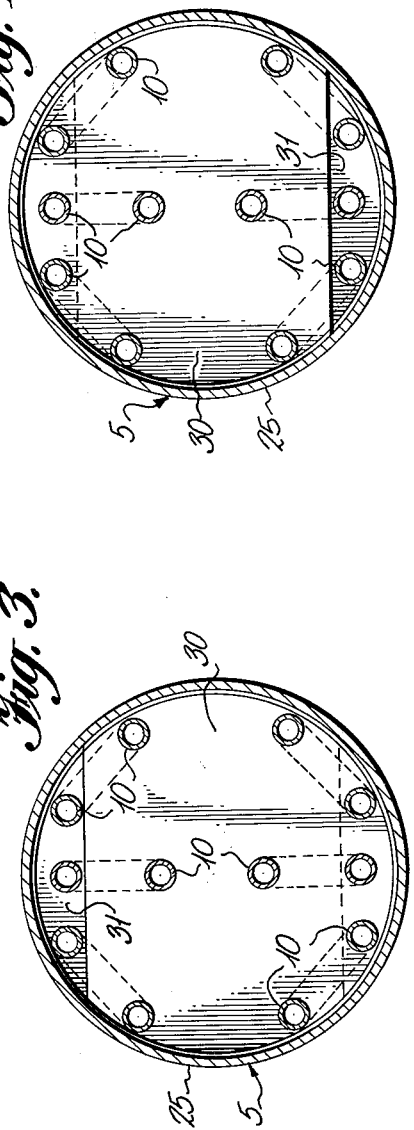

Patented Sept. 4, 1962

3,052,102
HEAT PUMP AND METHOD OF OPERATION
Woodrow W. McMillan, P.O. Box 5897, 1501 Miami
Road, Jacksonville 7, Fla.
Filed Apr. 5, 1957, Ser. No. 650,911
2 Claims. (Cl. 62—81)

This invention relates to heat pump systems, to methods of operating such systems and particularly to heat exchange coil units for use in such systems.

In heat pump systems it is desirable to incorporate both cooling and heating cycles of operation and to have the system automatically controlled. In water to air systems, it is desirable to have a coil unit which can be used either as an evaporator in the heating cycle or as a condenser during the cooling cycle. There have been many difficulties in perfecting a coil unit of this nature which would be satisfactory in use. It is well known that chemical reaction of the water causes formation of scale on coils of this type which seriously affects the efficiency of the coil. This necessitates cleaning, which can be costly, time consuming, and, with certain types of coil structure, virtually impossible. This problem has limited coil construction to certain types wherein the coils are accessible for cleaning.

It is an object of the present invention to provide a coil unit which can be used alternately as an evaporator and a condenser in a water to air heat pump system.

It is also an object of the present invention to provide a heat pump system which can be operated when desired to be self cleaning, so that all scale will be loosened and removed from the coil unit without manual cleaning.

Another object is the provision of a method of operating a heat pump system so as to effect a self-cleaning operation to remove scale.

A further object is the provision of a heat transfer coil unit of special construction, suitable for use in a system of the type referred to.

A more specific object of the invention is to provide a heat pump system having a water coil of particular structure which can be operated to freeze water upon the coil surface and remove scale by causing the ice to break from the coil, carrying the scale with it.

Other objects of the invention will become apparent from the following description of one practical embodiment thereof when taken in conjunction with the drawings which accompany, and form part of, this specification.

In the drawings:

FIGURE 2 is a longitudinal section through a water coil unit constructed in accordance with the present invention, and is taken on the line 2—2 of FIGURE 1;

FIGURE 3 is a transverse section through the coil unit taken on the line 3—3 of FIGURE 2; and, FIGURE 4 is a transverse section taken on the line 4—4 of FIGURE 2.

Figure 1:
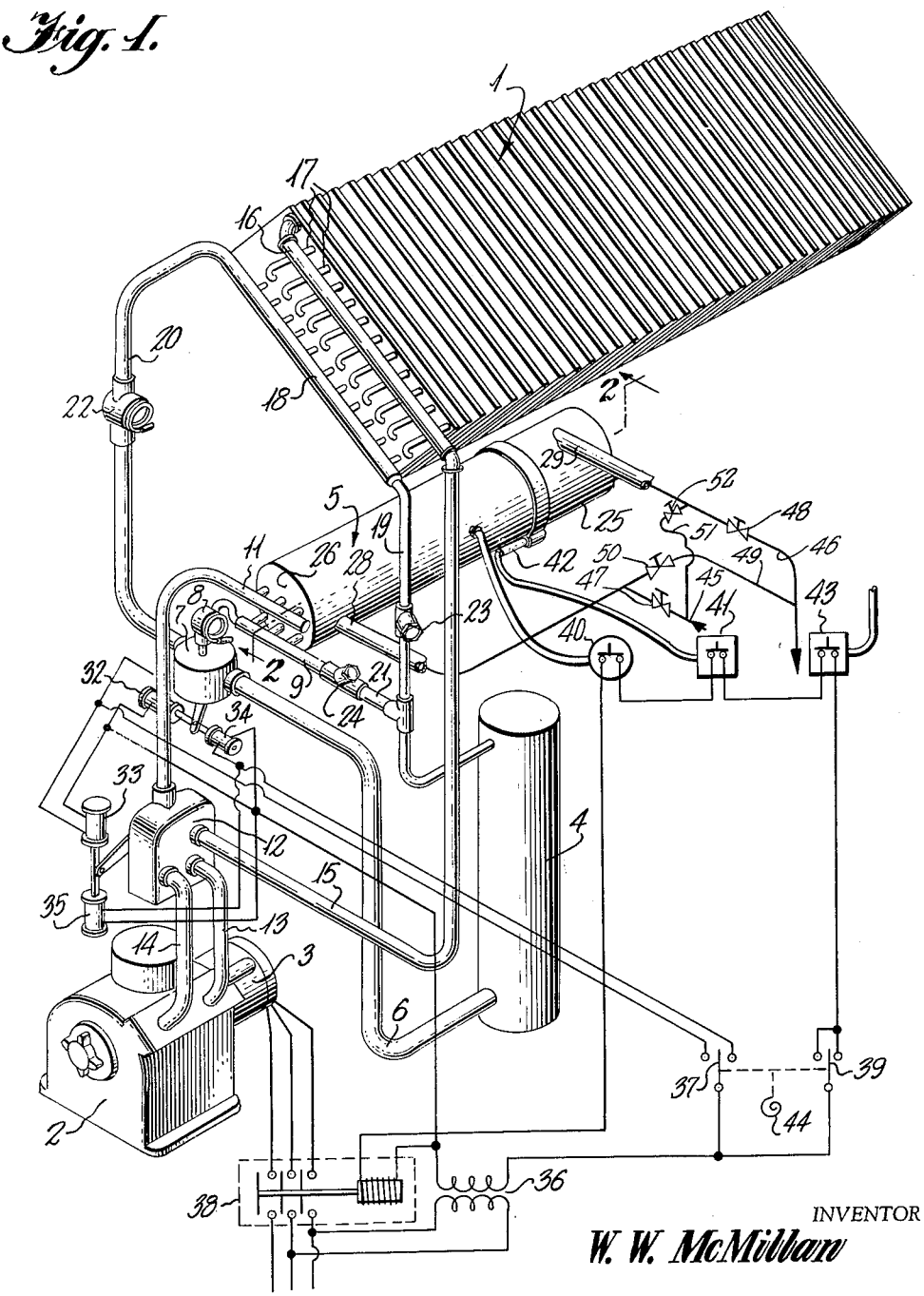
FIGURE 1 is a diagrammatic perspective view of a heat pump system including a specially constructed water coil unit.

In general, the invention comprises a water coil unit of particular construction in a heat pump system with automatic means for causing the coil unit to function alternately as an evaporator and as a condenser, which system can be operated to freeze water on the coil surfaces and remove scale therefrom by a sudden thawing cycle. The invention also includes this method of operation of a heat pump system.

Referring to the drawings in detail, there is shown a refrigerant to air heat transfer coil 1, a compressor 2 driven by the usual motor 3, a receiver 4 and a water to refrigerant heat transfer coil unit 5. These elements are connected so that either coil 1 or coil unit 5 can serve as a condenser or evaporator depending upon whether the system is to be used for heating or for cooling.

The refrigerant system includes a line 6 from the bottom of receiver 4, a solenoid-controlled, three-way valve 7, expansion valve 8 and manifold 9 to which the ends of coils 10 of the water coil unit 5 are connected. The opposite ends of coils 10 are connected to a manifold 11, which communicates with a four-way solenoid-controlled valve 12 governing refrigerant flow to and from the compressor. Lines 13 and 14 connect to valve 12 and extend to and from the compressor. Line 15 is connected from the valve 12 to a manifold 16 joined to one end of the coils 17 of the heat transfer unit 1. The four-way valve 12 is of the type which will establish refrigerant flow from coil 1 to coil unit 5 or from coil unit 5 to coil 1 while maintaining unidirectional flow through the compressor. Coils 17 have their opposite ends connected to a manifold 18 which is joined to line 19 emptying into the receiver. Bridge line 20, from three-way valve 7 to manifold 18, and a bridge line 21, from manifold 9 to the return line 19, are provided to permit reversal of refrigerant flow as will be described. Line 20 includes an expansion valve 22, and return line 19 and line 20 carry check valves 23 and 24, respectively, which permit refrigerant flow to the receiver but not in the opposite direction.

Water coil unit 5 is of special construction. It comprises an outer cylindrical casing 25, containing a tube bank made up of one or more serpentine coils 10. Three are shown, and each has its ends projecting through the end plate 26 of the casing for connection to the manifolds 9 and 11. End plate 26 is welded to the casing, as is a plate 27 at the opposite end of the casing. Thus, the coils are permanently sealed within the casing. Refrigerant passes through the coils 10, and the casing is adapted to receive the water which is to flow about the coils in heat exchanging relation to take heat from or release it to the refrigerant in the coils 10 depending upon whether the coil unit 5 is being operated as an evaporator or a condenser. Water enters the casing through an inlet fitting 28 near one end and adjacent the bottom of the casing when the casing occupies its normal, horizontal position. The water outlet 29 is near the opposite end and adjacent the top.

In order to increase the water velocity across the tube bank for better heat transfer, a plurality of baffles 30 are used with the baffles parallel to each other and transversely of the casing. The baffles are circular with a chordal section removed. Thus, when the baffles are within the casing the space between the flat edges of the baffles and the casing form passageways 31 for the flow of water along the casing. The baffles are reversely positioned so that one passageway is at the top and the next at the bottom. This causes a rapid circulation of the water back and forth across the tubes of the bank from one end of the casing to the other.

The two solenoid valves 7 and 12 of the system may be automatically controlled by a suitable thermal responsive switch, so as to shift the system from heating to cooling cycles and reverse, and the compressor motor circuit may include various safety switches and a suitable starting circuit. All of these things are well known in the art and any well known circuitry may be used. However, for purposes of illustration only, a simple circuit is shown in conjunction with FIGURE 1.

The valves 7 and 12 will be moved to their heating or cooling cycle positions by energization of their solenoids 32 and 33 and 34 and 35, respectively. These solenoids are connected across the secondary of a transformer 36 forming part of the starting circuit for the compressor motor. A thermostatically controlled switch 37 will be in the line to energize the solenoids 32 and 34 for heating or solenoids 33 and 35 for cooling. The valves will be operated simultaneously.

A starter coil and switch for motor 3 is shown at 38. This closes the line of the motor. The starter coil is bridged across the secondary of the transformer and includes a switch 39. Switches 37 and 39 may be separate and tied together for simultaneous operation or they may represent the several contacts of a plural contact switch.

The motor holding circuit will include several safety switches: A water pressure switch 40 which will open upon pressure drop and prevent operation of the system without proper water pressure; a thermostatic switch 41 having a bulb 42 strapped to the casing 25 to prevent damage to the coil unit at low temperatures; and, a high-low pressure switch 43 responsive to refrigerant pressures. All three of these switches are normally closed and the three switches are in series in the circuit so that compressor operation will be stopped if any one operates.

When the system is operating in normal manner, the switch 37 will be closed with one or the other of its contacts to establish circuits to the proper solenoids of the valves 7 and 12 to operate the valves to heating or cooling cycle position. Switch 39 will be actuated by the thermostat 44 (as will be the switch 37) to start and stop the compressor in accordance with the requirements of the space to be conditioned. During the heating cycle, the coil unit 5 will act as an evaporator and coil 1 as a condenser. Liquid refrigerant will flow from the receiver 4 through pipe 6 to the three-way valve 7. The valve will be set to close line 20 and open the port to expansion valve 8. The refrigerant will flow through the expansion valve, the manifold 9 into the bottom ends of coils 10. The refrigerant will vaporize picking up heat from the water in the casing 25. The gaseous refrigerant will then pass through the compressor and through line 15 and manifold 16 to coil 1. The hot gas will circulate through the coil, liquefying and giving off its heat to atmosphere. It will then return to receiver 4 by way of manifold 18 and line 19.

When the system is to be used for cooling, the valves will be reversed, so that liquid refrigerant will flow through valve 7, line 20, expansion valve 22 and into coil 1. Coil 1 will act as an evaporator and the refrigerant will vaporize picking up heat from the air. The gas will flow through line 15, the four-way valve 12, the compressor and into coil unit 5 by way of manifold 11. This unit will act as a condenser and the gas will be condensed, giving up its heat to the water.

As mentioned above, operation of a coil unit such as the unit 5 over a period of time will cause scale to form on the outside of the refrigerant coil surfaces. This will cut down on efficiency by retarding heat exchange between the refrigerant and water. In accordance with the present invention this can be removed by a forced operation of the system.

As part of the scale removing operation, it is necessary to back flush the coil unit 5 to flush scale broken away from the coil surfaces out of the unit. To provide for normal and reverse flow, a simple system of feed and discharge lines, bridged from one to the other and controlled by appropriate valves, may be used. Such a system is shown diagrammatically in FIGURE 1. A pipe line 45 may lead from the well to the normal coil unit inlet 28, and a discharge line 46 will connect to the unit outlet 29. These lines will be controlled respectively by valves 47 and 48. In order to reverse the flow through the coil, a bridge line 49 is connected from line 45, between valve 47 and the coil unit, to line 46 between the valve 48 and the discharge point. This line is controlled by valve 50. A second bridge line 51 is connected to the inlet line 45 ahead of the valve 47 and to the line 46 between valve 48 and the coil unit. This line is controlled by valve 52. It will be obvious that with valves 47 and 48 open and valves 50 and 52 closed normal flow through line 45 into coil inlet 28 and out through outlet 29 and line 46 will be had. When valves 47 and 48 are closed and valves 50 and 52 opened, water will flow from the well through line 45, line 51, valve 52 to connector 29 of the unit 5, reversely through the unit, out through connection 28 and through line 49, valve 50 and line 46 to discharge.

Under normal operation, the water in casing 25 is approximately 70°. When it is desired to remove scale from the water coil, the system is manually set for a heating cycle. Thus, the unit 5 will function as an evaporator. The water control valves 47, 48, 50 and 52 will be closed to prevent water circulation and the system allowed to operate for a sufficient time to cause ice to form upon the coils 10. A thickness of one-half inch has been found to be sufficient. Therefore, the temperature switch 41 will be set to open when the casing temperature has reached a low indicating the formation of the desired ice formation on the coils. Then, the valves 50 and 52 will be opened to reverse the normal flow of water so that water will flow into the normal water outlet 29 at the top of the casing and out of the inlet 28 at the bottom. The cycle is reversed so that the hot gases will flow through the coil 10. This will cause a quick thaw, cracking the ice layer so that it will break away from the coils carrying the scale with it. When the ice melts the scale and sludge will be flushed from the casing by the water flow. When complete melting and flushing are accomplished, valves 50 and 52 are closed and valves 47 and 48 opened, and the system returned to automatic control.

It will be obvious that the use of a coil unit, such as the unit 5, in a heat pump system permits use of the system for heating and cooling with the unit serving as evaporator or condenser as required. The unit may be completely sealed, yet cleaned periodically by a forced operation of the system. It will be evident also that in a system such as disclosed the operating procedure may be reversed and the unit 5 will become means for heating or cooling water within the casing.

While in the above one practical embodiment of the invention has been disclosed, it will be understood that the specific structure shown and described is merely by way of example and the invention may take other forms within the scope of the appended claims.

What is claimed is:

1. A method of operation of a heat pump system having a water to refrigerant heat transfer unit including a sealed casing having an inlet and outlet for water and a coil connected to the refrigerant circuit of the system with the transfer unit being operable as an evaporator during a heating cycle and as a condenser during a cooling cycle, including operating the system as a heating system to cause the heat transfer unit to operate as an evaporator, stopping the flow of water through the heat transfer unit, continuing the heating operation until a layer of ice of predetermined thickness forms on the surface of said refrigerant coil, reversing the cycle of operation to cooling to run hot gases through the refrigerant coil to cause the ice layer to crack and break off carrying with it scale which may have formed on the coil.

2. In a method of operation of a heat pump system as claimed in claim 1, back flushing the casing after thawing to remove all loose scale and sludge.

References Cited in the file of this patent

UNITED STATES PATENTS

| | | |
|---|---|---|
| 1,904,875 | Metzgar | Apr. 18, 1933 |
| 2,049,748 | Rathbun | Aug. 4, 1936 |
| 2,293,532 | Crane | Aug. 18 1942 |
| 2,425,119 | Papay | Aug. 5, 1947 |
| 2,517,169 | Bennett | Aug. 1, 1950 |
| 2,558,938 | Dillman | July 3, 1951 |
| 2,568,891 | Kals | Sept. 25, 1951 |
| 2,585,748 | De Silvestro | Feb. 12, 1952 |
| 2,728,197 | Ellenberger | Dec. 27, 1955 |
| 2,748,572 | Parcaro | June 5, 1956 |
| 2,764,876 | Parcaro | Oct. 2, 1956 |